(12) United States Patent
Rasmussen

(10) Patent No.: US 9,107,536 B1
(45) Date of Patent: Aug. 18, 2015

(54) SELF-CLEANING GRILL

(76) Inventor: Betty Rasmussen, Abilene, TX (US)

( * ) Notice: Subject to any disclaimer, the term of this patent is extended or adjusted under 35 U.S.C. 154(b) by 575 days.

(21) Appl. No.: 13/437,147

(22) Filed: Apr. 2, 2012

(51) Int. Cl.
*A47J 37/00* (2006.01)
*F24B 3/00* (2006.01)
*F24C 3/00* (2006.01)
*A47J 37/07* (2006.01)

(52) U.S. Cl.
CPC .................................. *A47J 37/0713* (2013.01)

(58) Field of Classification Search
CPC ...... F24C 14/025; F24C 14/00; F24C 14/005; F24C 14/02; A47J 37/0713; A47J 37/0727
USPC .................. 126/25 R, 29, 39 E; 431/280, 281
See application file for complete search history.

(56) References Cited

U.S. PATENT DOCUMENTS

| 6,543,435 | B1 * | 4/2003 | Regen et al. | 126/25 R |
| 2003/0213484 | A1 * | 11/2003 | Alden et al. | 126/41 R |
| 2005/0178450 | A1 * | 8/2005 | Tupa et al. | 137/625.47 |

\* cited by examiner

*Primary Examiner* — Avinash Savani
*Assistant Examiner* — Vivek Shirsat
(74) *Attorney, Agent, or Firm* — Warren V. Norred

(57) ABSTRACT

The invention is a self-cleaning outdoor gas grill that employs a second set of gas nozzles within the grill cavity. An operator switches gas flow from the cooking nozzles to the cleaning nozzles, which elevates the grill cavity temperature to burn food residue as the cleaning nozzles allow for much greater gas flow than the cleaning nozzles.

1 Claim, 1 Drawing Sheet

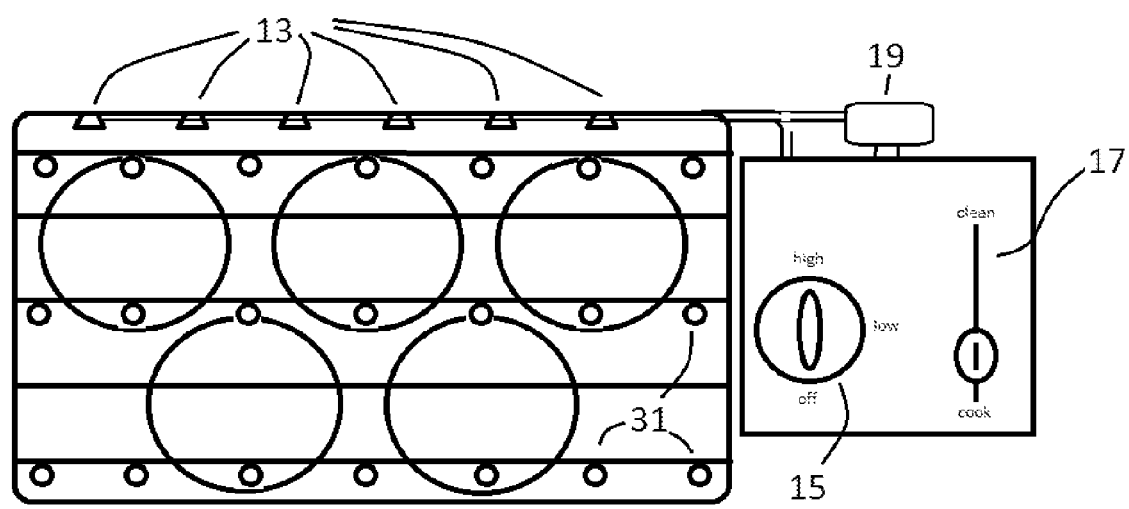

SELF-CLEANING GRILL

CROSS-REFERENCES TO RELATED APPLICATIONS

None.

STATEMENT REGARDING FEDERALLY SPONSORED RESEARCH AND DEVELOPMENT

None.

THE NAMES OF THE PARTIES TO A JOINT RESEARCH AGREEMENT

None.

INCORPORATION-BY-REFERENCE OF MATERIAL SUBMITTED ON A COMPACT DISC

None.

BACKGROUND OF THE INVENTION

1. Field of the Invention

The invention pertains to natural gas grills.

2. Background Art

Traditional back-yard grills are heated by ignited natural gas. After even a short period of use, grill grates tend to become caked with grease and food residue. The process of cleaning these grills is tedious; owners of such grills struggle to maintain cleanliness of the grates.

An overview of the prior art includes grilling lattices that use electricity to burn off residue, U.S. Pat. No. 3,997,761, a metal heat-capturing sheet, U.S. Pat. No. 4,420,398, several patents on self-cleaning ovens that employ an elevated temperature in some manner, including U.S. Pat. No. 3,423,568 and U.S. Pat. No. 6,316,749, and a water-spray system U.S. Pat. No. 7,677,239.

As these and other patents show, inventors and the grill industry continue to struggle in building easy-to-clean grills.

BRIEF SUMMARY OF THE INVENTION

The invention is a grill that is cleaned by the heat generated by supplemental gas nozzles in the grill which are employed to heat the grill's interior at an elevated temperature. During the cleaning cycle, an operator manually opens a valve to supply the supplemental nozzles, which allow greater gas flow than available through the cooking nozzles.

BRIEF DESCRIPTION OF THE SEVERAL VIEWS OF THE DRAWING(S)

FIG. 1—A top view of an embodiment of the invention.

DETAILED DESCRIPTION OF THE INVENTION

Elevated temperatures may be used to cook food residue into ash in a grill 11 with an embodiment as shown in FIG. 1 by the use of auxiliary gas nozzles 13 which are placed in the grill and supplied with gas when a feed valve 15 is opened.

Under normal cooking conditions, the grill 11 uses its ordinary gas tube system and nozzles 31, found in every backyard gas grill.

To activate the cleaning cycle, the operator 1) turns the gas level control to maximum, typically a knob or slide 15, 2) and slides a cleaning valve switch 17 from the "cook" position to the "clean" position.

When the cleaning valve switch 17 moves from "cook" to "clean", the gas valve first opens gas flow to the supplemental gas nozzles 13, and then closes the flow to the cooking nozzles 31. By first establishing flow in both sets of nozzles before shutting off the gas to the cooking nozzles 31 first, gas coming from the cleaning nozzles 13 is ignited by the already established flame of the cooking nozzles 31. When the valve is finished its full movement, it completely ceases all flow to the cooking nozzles 31.

The cleaning nozzles 13 are constructed to allow for much greater gas flow than the cooking nozzles 31, thereby raising the temperature inside the grill high enough to burn the food residue to ash.

In the simplest embodiment, an operator must manually turn the grill from "cook" to "clean" mode, but a more complex model can easily be created that automatically operate the cleaning valve switch 17, first to open it, then after a predetermined time, to close it and put the grill back into cooking mode.

While this invention has been described as it is currently built, the invention is not limited to the disclosed embodiments, but can be employed in various equivalent arrangements included within the spirit and scope of the claims.

I claim:

1. A gas-operated outdoor grill comprising: a first set of gas nozzles for cooking food; a second set of gas nozzles disposed along the periphery of a grill surface for cleaning the grill, wherein the second set of gas nozzles allow a larger amount of gas flow than the first set of gas nozzles, thereby raising the temperature inside the grill high enough to convert the food residue to ash; a cleaning valve switch which can be positioned between a cook position, in which gas is delivered to the first set of nozzles, and a clean position, in which gas is delivered to the second set of nozzles; and a gas control valve which delivers a variable amount of gas to the first set of nozzles and a fixed amount of gas to the second set of nozzles; wherein, when the cleaning valve switch moves from the cook position to the clean position the gas control valve first opens gas flow to the second set of nozzles, and then closes the flow to the first set of nozzles, by first establishing flow in both the first set of nozzles and the second set of nozzles prior to shutting off the gas to the first set of nozzles the gas from the second set of nozzles is ignited by the already established flame of the first set of nozzles, when the gas control valve completes its full movement gas flow to the first set of nozzles is ceased specifically designed to raise the temperature in the grill sufficient to clean its interior.

* * * * *